Aug. 29, 1961 W. G. BOETTINGER 2,997,879
SHOCK RESISTANT BAROGRAPH
Filed July 9, 1958 2 Sheets-Sheet 1

INVENTOR
WILLIAM G. BOETTINGER

BY Henry L. Shenier

HIS ATTORNEY

Aug. 29, 1961  W. G. BOETTINGER  2,997,879
SHOCK RESISTANT BAROGRAPH
Filed July 9, 1958  2 Sheets-Sheet 2
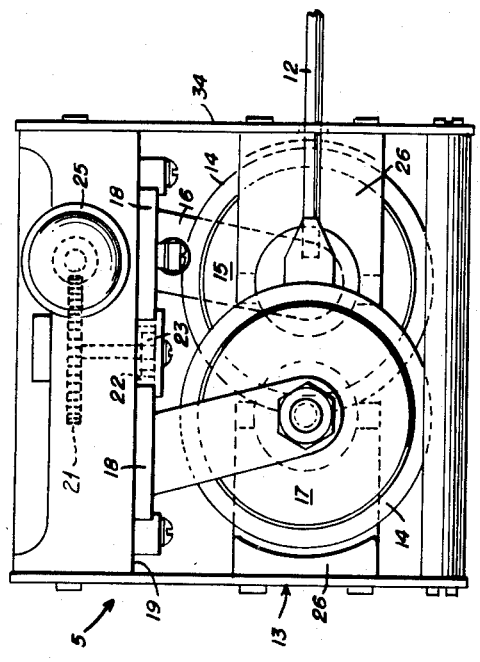
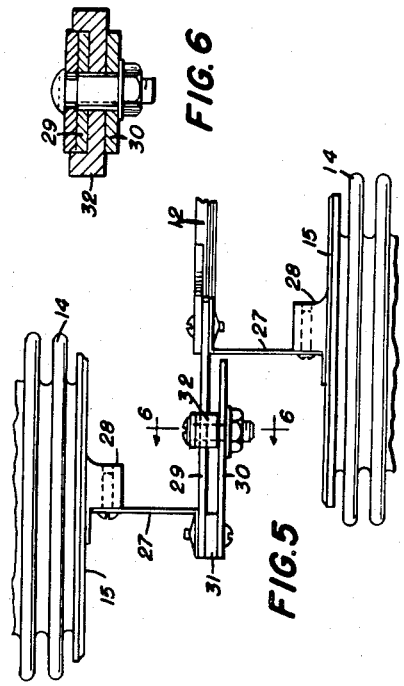
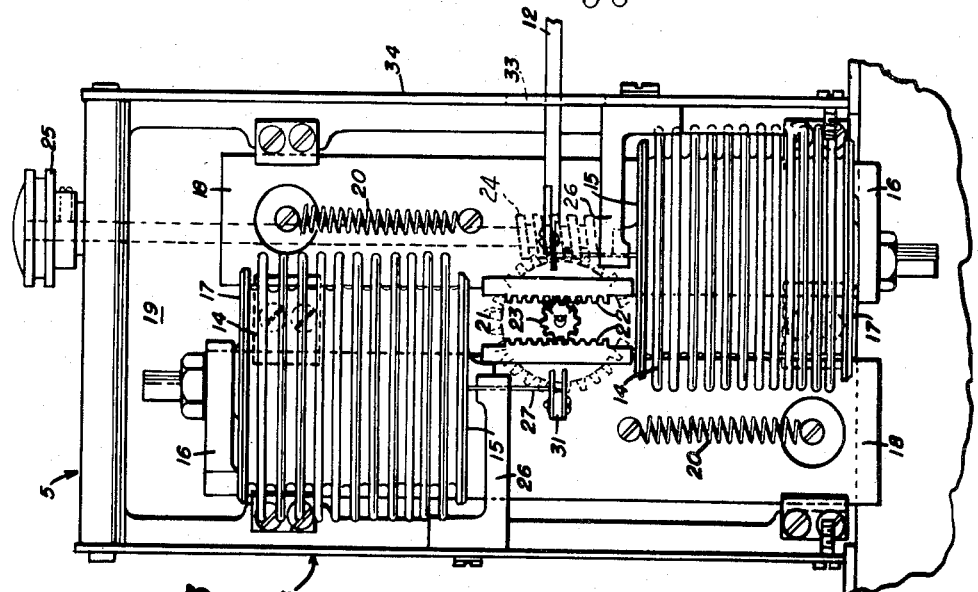
INVENTOR
WILLIAM G. BOETTINGER
BY
HIS ATTORNEY United States Patent Office 2,997,879
Patented Aug. 29, 1961

2,997,879
SHOCK RESISTANT BAROGRAPH
William G. Boettinger, Baltimore, Md., assignor to Belfort Instrument Company, a corporation of Maryland
Filed July 9, 1958, Ser. No. 747,499
9 Claims. (Cl. 73—387)

My invention relates to meteorological instruments and more particularly to barographs for measuring and recording atmospheric pressure and changes in atmospheric pressure with extreme accuracy.

There are two problems which must be solved in designing a barograph of great accuracy. One problem is friction. The second and basic problem is sensitivity to shocks and other extraneous vibrational transients. In barographs having appreciable friction and sensitivity to shocks, the recording contains considerable jitter, grass, or hash, which obscures the true readings, rendering them uncertain, and prevents an accurate determination of slight gradients and trends of change in atmospheric pressure.

In barographs of the prior art the measurement magnifying lever is journaled adjacent its center of percussion in a bearing attached to the case. A pressure sensitive element, such as a Sylphon bellows or aneroid diaphragm, is connected to the lever on one side of this fixed pivot. To remove backlash from the pivot, a small additional biasing spring is also connected to the lever. This biasing spring, while it does remove backlash, also creates moderate friction in the bearing. Such a barograph is extremely sensitive to shock. A transient applied to the case of the instrument is coupled with no diminution through the pivot directly to the measuring lever. The positioning of the pivot adjacent the center of percussion tends to reduce this direct, unattenuated shock. But shocks transmitted to the case are propagated through the pressure sensing element to the measuring lever at a point displaced from the center of percussion. Accordingly, single pressure-element barographs of the prior art have moderate friction but extreme sensitivity to shock, mainly because of the asymmetrical positioning of the pressure sensing element from the center of percussion of the measuring lever.

In other barographs of the prior art, a pair of opposed pressure sensing elements are connected in push-pull to either side of the center of percussion of the measuring lever; and again the measuring lever is journaled in a bearing connected to the case adjacent the center of percussion. In order to eliminate backlash from the pivot, one pressure sensitive element is placed under slight compression and the other pressure sensitive element is placed under slight tension. The bearing friction introduced is very high, since, if the expansion rates of the two elements are not identical, exceedingly large pivot forces result. This construction, however, does reduce the sensitivity to shock. Shock forces transmitted to the case are propagated through the two pressure sensing elements to the measuring lever at points displaced on either side of the center of percussion. But the restraint imposed on the free ends of the pressure sensing elements, one under tension and the other under compression, causes differential attenuations and differential phase shifts in the propagations through the two elements. Since shocks arrive with unequal intensities and at different times, rotational forces are coupled to the measuring lever. Also shocks are transmitted directly, without attenuation, through the pivot to the lever. The positioning of this pivot or bearing adjacent the center of percussion tends to reduce these direct, unattenuated shocks. Accordingly, barographs of the prior art using two opposed pressure sensitive elements in push-pull have moderate sensitivity to shock but serious friction.

One object of my invention is to provide a barograph having no pivot friction in the measuring lever.

Another object of my invention is to provide a barograph having negligible sensitivity to shock.

A further object of my invention is to provide a barograph which accurately records atmospheric pressure and changes therein with substantially no jitter, grass or hash to obscure and render uncertain the true pressures.

Other and further objects of my invention will appear from the following description.

In general my invention contemplates a barograph with a measuring lever having a center of percussion relative to one end, the motion of which end indicates a change in pressure. This lever is connected to the case solely through a pair of identical springs or flexible elements disposed on either side of the center of percussion of the measuring lever. At least one of the springs or flexible elements is pressure sensitive; and preferably both spring elements are pressure sensitive and connected in the conventional push-pull relationship. My barograph has no journal or bearing; and therefore has no pivot friction associated with the measuring lever. The measuring lever floats freely on the two springs; and no restraint is placed on the free ends of the pressure sensitive elements. Shocks applied to the case will be propagated with equal attenuations and equal phase shifts to the measuring lever. Even if the two spring elements do not have identical propagation constants, the attenuation of shock is sufficiently high that very little jitter or hash will be recorded. The elimination of a bearing connected directly to the case eliminates the transmission of violent shocks directly to the measuring lever. My measuring lever, for changes in pressure, will rotate about a virtual or imaginary pivot located along the length included between the points of connection of the identical spring elements. My measuring lever, for shocks propagated through the springs, will tend to oscillate about its end, with the result that a negligible pressure change is indicated. Since for shocks the indicating end of the lever remains stationary in space, no grass or jitter will be recorded.

In the accompanying drawing which forms part of the instant specification and which is to be read in conjunction therewith and in which like reference numerals are used to indicate like parts in the various views:

FIGURE 3 is a fragmentary front view on an enlarged scale showing the disposition of the pressure sensing elements with a portion of the measuring lever broken away to show the zero adjustment.

FIGURE 4 is a fragmentary top view on an enlarged scale showing the disposition of pressure sensitive elements and the zero adjustment.

FIGURE 5 is a fragmentary front view on a further enlarged scale showing the connection of the flexible pressure sensitive elements to the measuring lever and the adjustment for temperature compensation.

FIGURE 6 is a sectional view taken along the lines 6—6 of FIGURE 5 showing the adjustment for temperature compensation.

Figure 1:
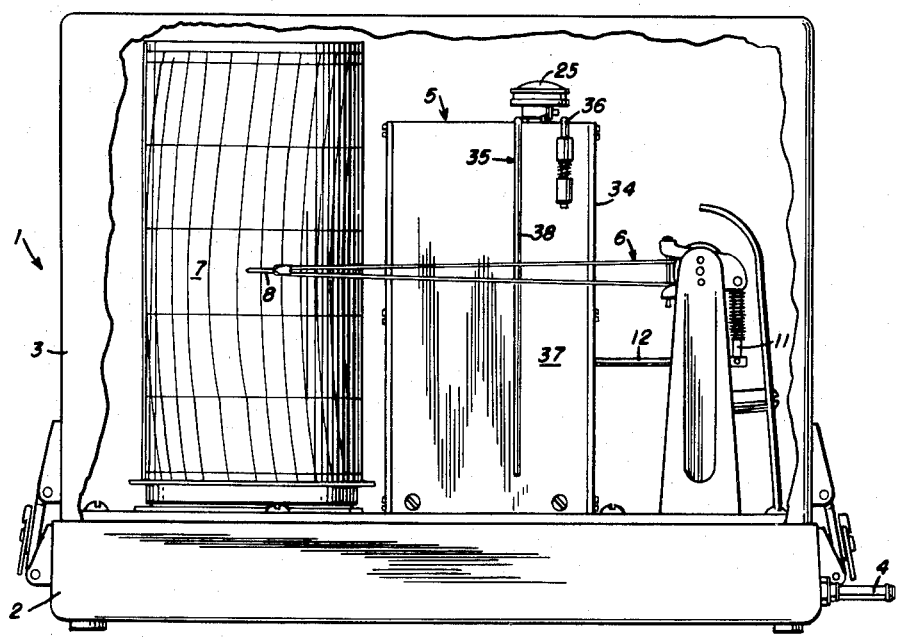
FIGURE 1 is a front view of my barograph with a portion of the cover broken away.
Figure 2:
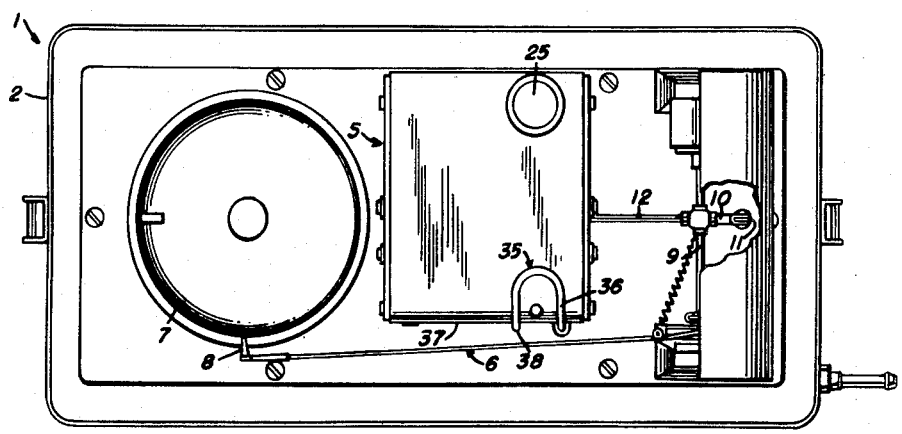
FIGURE 2 is a top view of my barograph with the cover removed and with parts broken away.

Referring now more particularly to FIGURES 1 and 2, my barograph is mounted within a case, indicated generally by the reference numeral 1, having a base 2 and a cover 3. Cover 3 is preferably clampable in airtight engagement with the base 2. A fitting 4 provides communication between the interior of the case 1 and the surrounding atmosphere. The cover 3 is provided with an observation window (not shown) so that the barograph recording may be observed without removing the cover 3. The casing 1 prevents wind gusts from affecting the recording. The pressure sensitive elements are mounted within an enclosure 5 positioned within the case 1. The measuring lever 12 extends through side wall 34 of the enclosure 5. One end of lever 12 is connected by a flexible linkage 11 to an arm 10 of a shaft 9 which drives the recording arm 6. A recording pen 8 is mounted on arm 6. Recording pen 8 engages a cylindrical chart 7 which is rotated by a clockwork mechanism (not shown). Recording pen 8 is maintained in contact with chart 7 by a spring connected from shaft 9 to the recording arm 6. Enclosure 5 is provided with a zero adjustment knob 25 on its top. A bar 35 has a pivot 36 on the front wall surface 37 of housing 5 and has a depending leg 38 adapted to lift the recording pen 8 from chart 7. Shaft 9 is provided with a suitable viscous friction rotation damper. The copending application of Melvin Dziwulski and Norbert Wagner, Serial No. 741,076, shows a viscous friction rotation damper having no static friction. Such damper also reduces somewhat the sensitivity to shock without increasing the static friction.

Referring now to FIGURES 3 and 4, mounted inside the enclosure 5 are a pair of opposing pressure sensitive elements 14, such as Sylphon bellows or aneroid diaphragms, which are highly evacuated and hermetically sealed. Sylphon bellows are preferable, however, since they act as better filters for transient shocks because of the large number of sections. A large number of sections produces a sharp cut-off characteristic with high attenuation of shock. One end 17 of each of bellows 14 is secured to each of brackets 16 which in turn are secured to each of slides 18. Slides 18 are adapted to move vertically on the rear wall 19 of enclosure 5. Each slide 18 is provided with a spring 20, one end of which is attached to slide 18 and the other end of which is attached to a post secured to the rear wall 19 of enclosure 5. Springs 20 exert forces on slides 18 which tend to pull the pair of pressure sensitive elements 14 together. Each of slides 18 is provided with a rack 22. A pinion 23, journaled in the rear wall 19 of enclosure 5, engages each of racks 22. Pinion 23 is mounted on a shaft to which is also secured a worm wheel 21. Worm wheel 21 engages a worm 24 which is driven by zero adjustment knob 25. The advance angle of the worm is less than the friction angle between the worm 24 and the worm wheel 21, so that the combination of worm wheel 21 and worm 24 is not reversible. The forces exerted by springs 20 on slides 18 are transmitted to pinion 23 but resisted by the worm and worm wheel combination. Side walls 13 and 34 of enclosure 5 are provided with a pair of stop brackets 26 which limit the expansion of bellows 14 with reduced atmospheric pressure or alternately limit the extent to which motion of the zero adjustment knob 25 will permit springs 20 to move slides 18 in such a manner that the bellows 14 approach each other. The stop brackets 26 prevent recording pen 8 from being driven downwardly beyond the minimum pressure recordable if, for example, the eye of a hurricane were to pass near the instrument. Stop brackets 26 also afford protection for the instrument in transit, in which case knob 25 would be turned to a minimum pressure to permit the bellows 14 to rest firmly on the stop brackets 26. Measuring arm 12 extends through a slot 33 in the side wall 34 of enclosure 5.

Referring now to FIGURES 3 and 5, the free ends of bellows or diaphragms 14 are each provided with a lug 28. A pair of flexible strips or leaf springs 27 are secured at one end to lugs 28 and are each secured at the other end to the measurement magnifying lever 12. Leaf springs 27 permit a rotation of lever 12 without cocking or canting the bellows 14. Leaf springs 27 afford a resilient connection between bellows 14 and lever 12 without the backlash and friction of journals, bearings, or pivots.

Referring now to FIGURES 5 and 6, I have provided compensation for the change in the elastic constant of bellows 14 with change in temperature of the metal of which they are formed. Leaf springs 27 are secured to the measurement lever 12 at spaced points about the center of percussion relative to that end of lever 12 which is connected to link 11. Lever 12 intermediate these points comprises a bimetallic strip 29, such that as the temperature decreases making the metal of the bellows stiffer and causing expansion of bellows 14 and a counterclockwise rotation of lever 12, bimetallic strip 29 causes a compensating clockwise rotation of the lever 12. An opposed bimetallic strip 30 shunts the first bimetallic strip 29, being secured to one leaf spring 27 through a spacer 31 and secured to the first bimetallic strip 29 by a movable clamp 32. Temperature compensating strips 29 and 30 each tend to bow oppositely with changes in temperature so that, for example, as the temperature decreases, strip 29 tends to cause a clockwise movement of lever arm 12 while strip 30 tends to cause a counterclockwise rotation of lever arm 12. If in FIGURE 5 clamp 32 is moved to the right, the temperature compensation will be decreased; and contrariwise, if clamp 32 is moved to the left, the temperature compensation will be increased.

Figure 7:
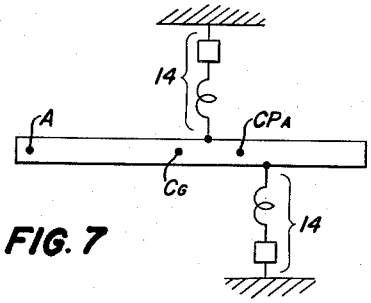
FIGURE 7 is a line drawing illustrating the mode of operation of my barograph.

Referring now to FIGURE 7, each of the bellows 14 is illustrated schematically as a spring and a mass connected in series between a stationary point and a point on the lever 12. The points at which the bellows 14 are connected to the lever are equally spaced and on opposite sides of the center of percussion $CP_A$ of the lever 12. The point at which the pressure measuring means is connected to the lever is indicated by the reference character A while the center of gravity of the lever 12 is indicated at $C_G$. In response to a change in pressure the lever 12 rotates about the point $CP_A$ to actuate the pressure measuring means. In response to shock, the lever 12 merely oscillates about a virtual pivot at the point A.

In operation of my improved barograph, if the atmospheric pressure decreases, each of bellows 14 will expand, causing a counterclockwise rotation of lever 12 about a virtual or imaginary pivot intermediate the points of connection of the pair of bellows 14 and substantially coincident with the center of percussion relative to that end of lever 12 which is connected to link 11. The rotation of lever 12 counterclockwise about its center of percussion causes link 11 to move upwardly and causes the recording pen 8 to move downwardly. If the atmospheric pressure increases, each of bellows 14 contracts, causing a clockwise rotation of lever 12 about its center of percussion, with the result that link 11 moves downwardly and recording pen 8 moves upwardly. If extreme vibrations or violent shocks are transmitted to the case 1 and thence to enclosure 5, bellows 14 attenuate this shock transient equally with equal phase shifts, because of the identical propagation constants of bellows 14; and, since the points of connection are disposed about the center of percussion of lever 12, the resultant attenuated shock is applied to the center of percussion. Lever 12 tends to oscillate about that end connected to link 11. However, link 11 moves neither upwardly nor downwardly but remains stationary; and recording pen 8 remains steady, creating no grass, jitter, or hash. My barograph is particularly adapted for shipboard use, being unsensitive to vibrations from propulsion machinery and to vibration resulting from the motion of the ship at sea.

My barograph has substantially no friction associated with the connection of bellows 14 to lever arm 12, since there is no bearing and no necessity for applying biasing forces to remove the backlash which would be occasioned by the use of a bearing. Substantially the only friction present in my barograph is the unavoidable friction between the recording pen 8 and chart 7 and the negligible friction in the linkage 11 which connects the lever 12 to the arm 10.

It will be seen that I have accomplished the objects of my invention. Since my barograph has no journal associated with the measuring lever, the friction in my barograph is reduced substantially to that existing between the pen and the chart. Since my barograph, for shock transients, tends to oscillate about a virtual pivot substantially coincident with the end connected to the recording pen, the instrument has negligible sensitivity to shock. My barograph having a minimum friction and a negligible sensitivity to shock, the recording of atmospheric pressure and changes of atmospheric pressure will be a smooth curve, without grass or hash, accurately representing the true changes in pressure. For changes in atmospheric pressure the measuring arm of my barograph will rotate about a virtual pivot substantially coincident with the center of percussion of the measuring lever if two pressure sensitive elements are used.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A pressure measuring device including in combination a lever having an end and a center of percussion relative to said end, a pair of flexible pressure sensitive elements having substantially identical attenuation and phase shift propagation constants, means connecting the pressure sensitive elements in push-pull relationship to the lever at points substantially equally spaced from and on opposite sides of the center of percussion, and means responsive to motion of said lever end for measuring pressure, the arrangement being such that the lever floats freely on the flexible elements independent of a fixed pivot and such that for changes in pressure the lever rotates about a first virtual pivot adjacent the center of percussion and such that for transient shocks transmitted through the flexible pressure sensitive elements the lever tends to oscillate about a second virtual pivot adjacent said lever end.

2. A pressure measuring device as in claim 1 in which the means connecting the pressure sensitive elements to the lever comprises a pair of leaf springs.

3. A pressure measuring device as in claim 1 in which the pair of flexible pressure sensitive elements are Sylphon bellows having equal numbers of similar sections.

4. A pressure measuring device as in claim 1 in which the lever comprises a temperature sensitive bimetallic portion.

5. A pressure measuring device as in claim 1 in which the lever comprises a pair of temperature responsive bimetallic portions acting in opposition and means for adjusting the effective length of one of said bimetallic portions.

6. A pressure measuring device as in claim 1 and including in combination means for limiting the expansion of the flexible pressure sensitive elements with decrease in pressure.

7. A pressure measuring device as in claim 1 and including in combination means for shifting the relative positions of the pair of pressure sensitive elements to set the device to a predetermined pressure.

8. A pressure measuring device as in claim 1 and including in combination means for moving the pressure sensitive elements in opposite directions relative to a fixed point to set the device to a predetermined pressure.

9. A pressure measuring device as in claim 1 and including in combination a pair of slidably mounted racks, means mounting one pressure sensitive element on each rack, a rotatable pinion disposed to engage each rack, spring forcing means for urging the racks in opposite directions, means including a worm for preventing rack forces from rotating the pinion, the worm having an angle of advance smaller than its friction angle, and means for rotating the worm to set the device to a predetermined pressure.

References Cited in the file of this patent
UNITED STATES PATENTS

| | | |
|---|---|---|
| 1,165,934 | Amthor | Dec. 28, 1915 |
| 1,239,565 | Collinson | Sept. 11, 1917 |
| 2,194,624 | Titterington | Mar. 26, 1940 |
| 2,265,045 | Pfeiffer | Dec. 2, 1941 |
| 2,431,098 | Wallace | Nov. 18, 1947 |
| 2,530,068 | McCabe | Nov. 14, 1950 |
| 2,656,721 | Melchior | Oct. 27, 1953 |
| 2,842,421 | Dreyfus | July 8, 1958 |